INVENTORS.
KURT FROEHLICH
EMIL GRIESHABER
BY Parker & Carter
Attorneys.

INVENTORS.
KURT FROEHLICH
EMIL GRIESHABER
BY Parker & Carter
Attorneys.

United States Patent Office 3,059,626
Patented Oct. 23, 1962

3,059,626
TWO-CYCLE SCAVENGING SYSTEM
Kurt Froehlich and Emil Grieshaber, Milwaukee, Wis., assignors to Nordberg Manufacturing Company, Milwaukee, Wis., a corporation of Wisconsin
Filed Mar. 15, 1960, Ser. No. 15,078
1 Claim. (Cl. 123—65)

This invention relates to a scavenging system for a two stroke cycle internal combustion engine.

One purpose of the present invention is a scavenging system for an internal combustion engine wherein the exhaust ports are positioned a greater distance from the cylinder head thereby providing a longer effective expansion stroke.

Another purpose is a scavenging system of the type described with maximum port area, both exhaust port and inlet port, but with minimum port height, thereby providing a longer expansion stroke.

Another purpose is an improved scavenging system of the type described utilizing greater cylinder exhaust port width to increase scavenging efficiency.

Another purpose is a scavenging system for a two stroke cycle internal combustion engine having greater efficiency.

Another purpose is an improved scavenging system having maximum inlet and exhaust port areas along with maximum effective stroke.

Other purposes will appear in the ensuing specification, drawings and claim.

The invention is illustrated diagrammatically in the following drawings wherein.

Figure 1:
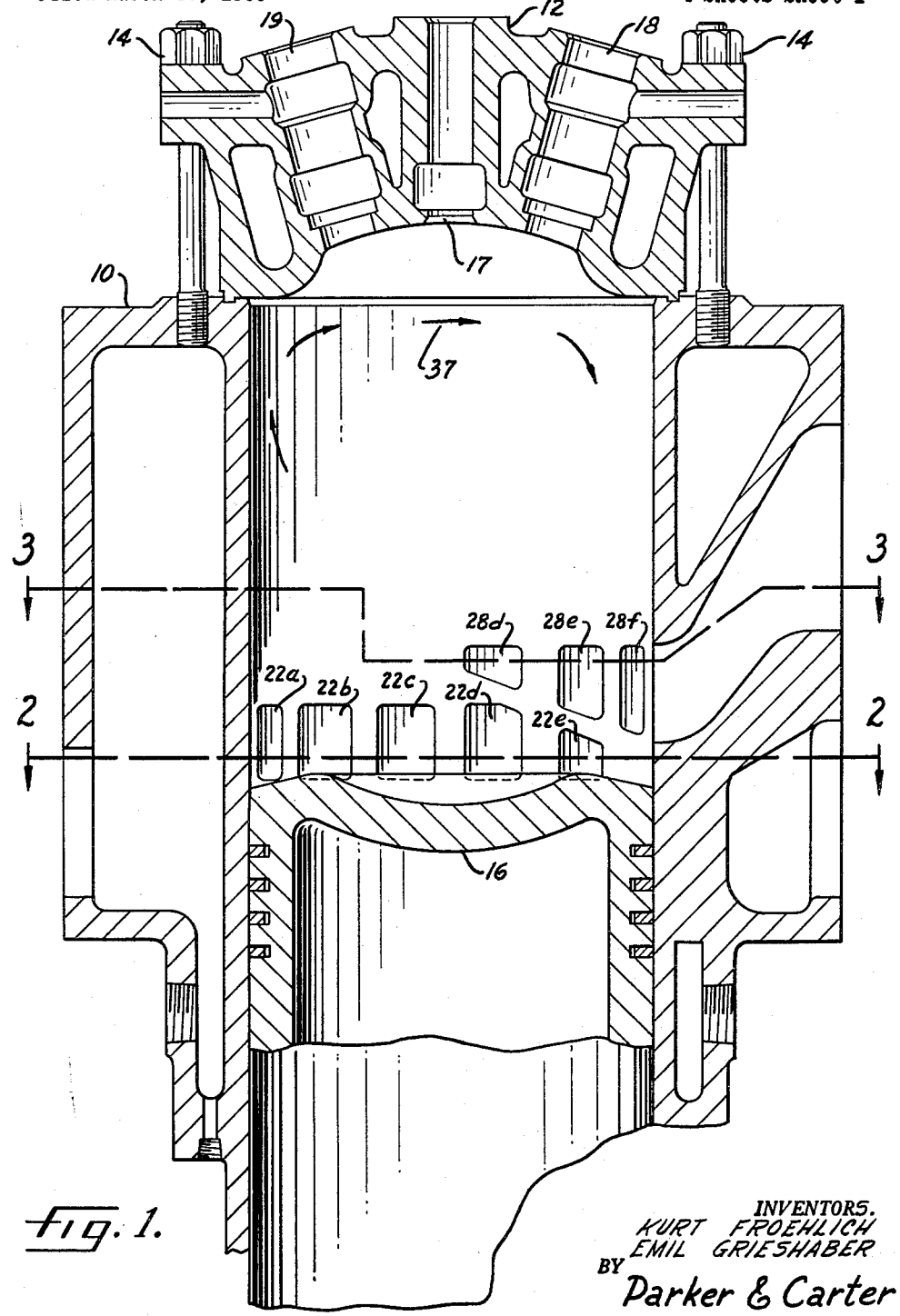
FIGURE 1 is a vertical section through a cylinder and cylinder head illustrating the improved scavenging system.

In FIGURE 1, a cylinder 10 may have a conventional cylinder head 12 secured thereto by means of bolts 14 or the like. A conventional piston 16 is mounted for reciprocation within the cylinder 10. The cylinder head may be provided with suitable openings or channels for valves, fuel injectors or the like. For example, if the engine is a dual fuel engine, a fuel injector of any conventional type may be positioned at 17, a gas valve at 18, and a starting air valve at 19, or suitable spark plug openings may be provided if the engine is a spark-fired engine. The details of the fuel supply system are not important.

The scavenging system comprises two spaced groups of circumferentially arranged scavenging air inlet ports indicated generally at 20 and 21. For convenience, each of the scavenging air inlet ports have been designated starting at the bottom left and going counterclockwise, as ports 22a, 22b, 22c, 22d and 22e. As each half or side of the cylinder is identical, corresponding inlet ports on each side of the cylinder have the same designation. The inlet ports, which are in communication with an inlet passage 26, are defined by a plurality of ribs 24 or the like. The inlet passage is closed off from the remaining portions of the cylinder by vertical walls 27.

Figure 3:
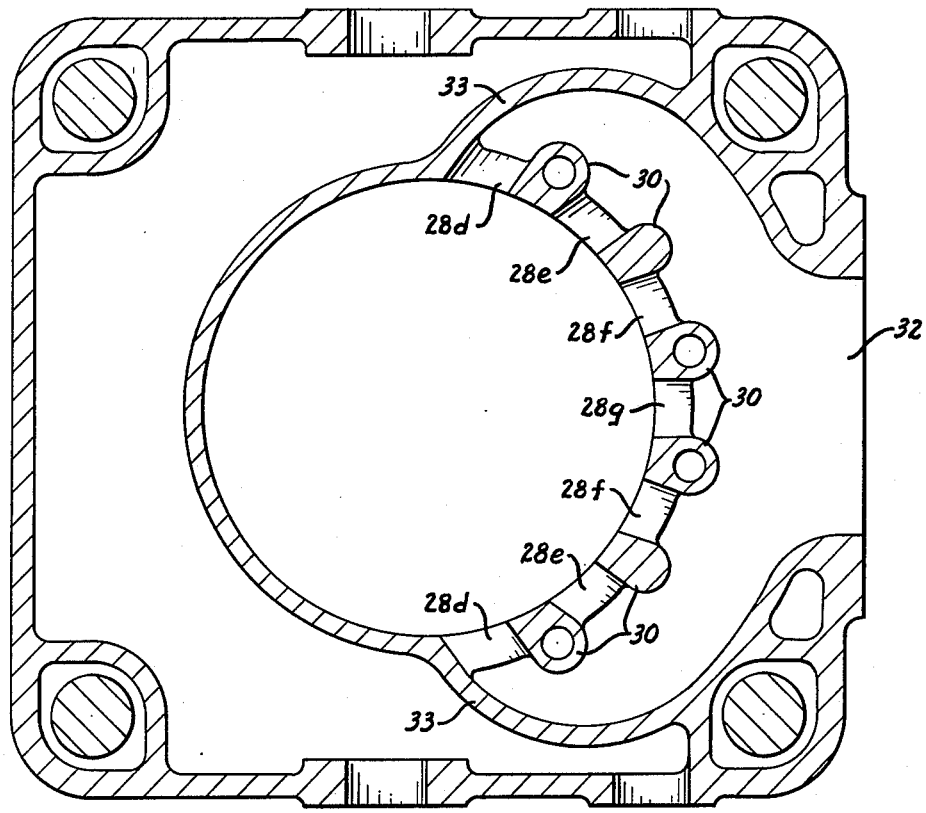
FIGURE 3 is a section along line 3—3 of FIGURE 1.

FIGURE 3 shows the detail of the exhaust ports which, starting at the top and going clockwise, are designated 28d, 28e, 28f, and 28g. As the exhaust ports are symmetrical, the three ports on the other side of port 28g are similarly designated 28f, 28e and 28d. The exhaust ports are each separated by a small rib 30 or the like and are in communication with an exhaust passage designated generally 32, which is closed off from the rest of the cylinder by vertical walls 33.

The effective stroke of the piston is normally measured from the top of the exhaust ports up to the highest point of piston travel or top dead center. Therefore, in order to increase the length of the effective stroke, it is necessary to decrease the height of the exhaust ports or increase the distance between the top of the exhaust ports and the cylinder head. Although it is advantageous to decrease the height of the exhaust ports, it is also desirable to have adequate exhaust port width so that, first, the gases will be quickly released during blowdown and, second, the residual gases will be blown out of the cylinder adequately during scavenging. It is desirable that there be maximum port area both for the scavenging air and for exhaust gases so that the exhaust gases may be removed as quickly as possible. Shown and described herein is an improved arrangement of both the scavenging air inlet ports and the exhaust ports wherein both the inlet port area and the exhaust port width is increased while the height of the exhaust ports is decreased to provide maximum effective stroke. The two groups of inlet ports are placed on opposite sides of the cylinder and are each overlapped, in part, by the exhaust ports.

The height of scavenging air inlet ports 22d and 22e have been decreased, as clearly shown in FIGURE 1, and the height of the exhaust ports 28d and 28e have similarly been decreased. In other words, those eports that overlap have been decreased in height or, stated another way, the exhaust ports that are positioned above and aligned with inlet ports are decreased in size as are the inlet ports that are positioned below these exhaust ports. This accomplishes an increase in inlet port area in that there is an increase in the number of inlet ports and it also increases the number of exhaust ports and the total exhust port width. By providing this overlapping, it is possible to decrease the overall height of the exhaust ports and therefore provide a longer effective stroke. The bottom of each of the inlet ports may lie in a common plane as may the top of the exhaust ports. By decreasing the distance between these two planes or, in effect, moving the exhaust ports down closer to the inlet ports, the effective stroke is increased. By providing exhaust and inlet ports that overlap or overlie one another, it is possible to provide an increase in exhaust port width and an increase in inlet port area and width.

Figure 2:
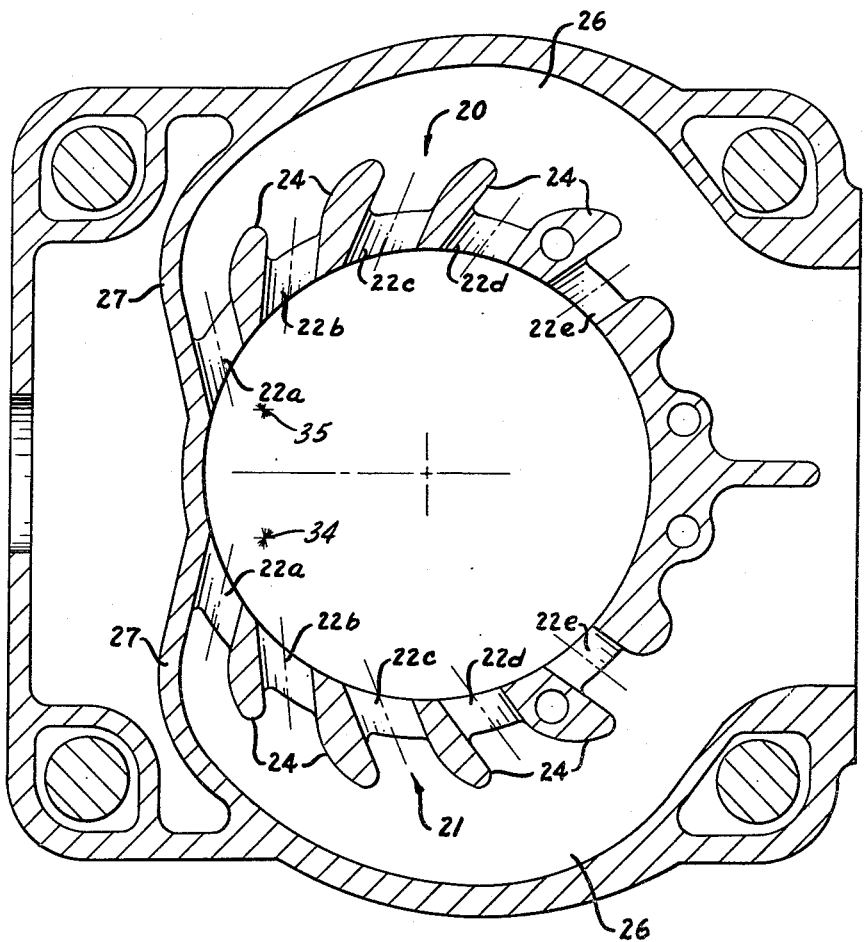
FIGURE 2 is a section along line 2—2 of FIGURE 1.
Figure 4:
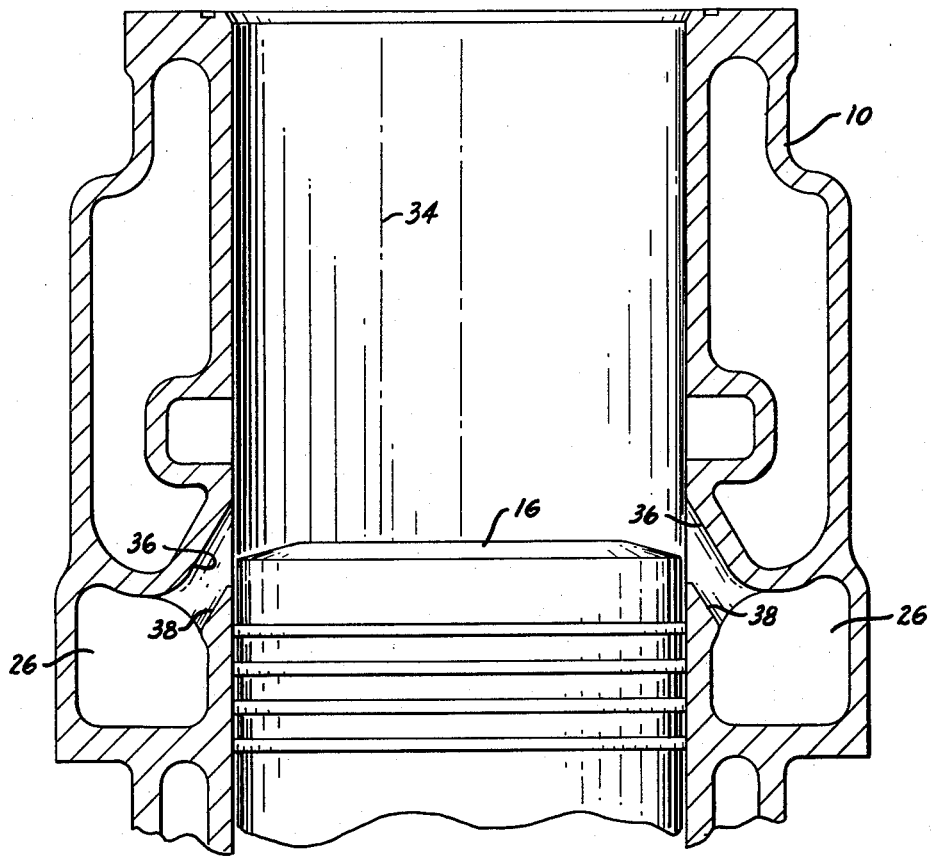
FIGURE 4 is a vertical section of the cylinder.

In the preferred form, the inlet ports are slanted upward so that the incoming air, which may be cooled and may be under pressure to increase the scavenging efficiency, will be directed upward along the side of the cylinder wall opposite the exhaust ports. The inlet ports on each side are directed generally toward a scavenging axis on the other side of the cylinder. For example, the center line or general direction of each of the ports 22a through 22e in the top half of the cylinder in FIGURE 2 is shown as directed more or less toward a scavenging axis 34 which, it will be noted, is positioned in the opposite forward quarter of the cylinder. The same is true of ports 22a through 22e in the lower half of FIGURE 2 which, as shown, have their center lines directed generally toward a scavenging axis 35 in the other forward quarter of the cylinder. As shown in FIGURE 4, the top and bottom surfaces 36 and 38 of the inlet ports may be at the same angle or may be slightly tapered to get the highest velocity at the cylinder entrance.

Figure 5:
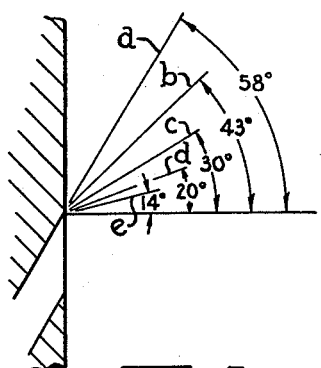
FIGURE 5 is a diagram illustrating the scavenging inlet port angles.

FIGURE 5 gives one example of a satisfactory relationship between the angles formed by each of the inlet ports. Preferably, the angle of inclination increases in a clockwise direction starting at inlet port 22e. The angle of inclination of ports 22d and 22e is relatively small so that the upper and lower surfaces of the ports are roughly perpendicular to the cylinder axis. In this way, the incoming or scavenging air from these ports will not collide with the exhaust, but will be directed across the cylinder. By increasing the angle of inclination on the inlet ports away from the exhaust ports, the incoming air will be swirled toward the scavenging axis and in an upward direction so that the path of the incoming scavenging air will be along the direction of arrows 37 shown in FIGURE 1. The air from the steeper inlet ports, such as 22a, will tend to pick up the air moving across the cylinder from the flatter ports. The scavenging air will move upwardly along the side of the cylinder opposite the exhaust ports, across the top adjacent the cylinder head, down the side of the cylinder adjacent the exhaust ports, and then out exhaust ports to the exhaust manifold. Thus an extremely efficient scavenging arrangement is provided in that both the inlet and exhaust port areas have been increased and, in addition, the air has been directed in a manner to more efficiently clean out the exhaust gases.

The scavenging system may be modified somewhat, depending upon the requirements of a particular installation. For example, the angle of inclination of the inlet ports might be increased, over that shown, and the scavenging axes 34 and 35 might be moved somewhat closer to the left cylinder wall in FIGURE 2 and therefore more remote from the exhaust ports. This would have the advantage of increasing the scavenging efficiency, since the incoming air would be directed more precisely up and along one cylinder wall, but would have the disadvantage of slightly reducing the total inlet port area.

For example, the inlet port 22a, in FIGURE 5, is shown with an angle of inclination of approximately 58 degrees. But if the scavenging axes were moved somewhat closer to the left wall, in FIGURE 2, of the cylinder, the angle of inclination might be changed to approximately 62 degrees, with the other angles being correspondingly changed. Suffice it to say that the precise angles and the precise location of the two axes relative to the cylinder walls is not important, other than that the scavenging axes 34 and 35, which indicate the direction of the inlet ports, should be in opposite forward quarters of the cylinder, as mentioned.

One of the most important advantages is that the total exhaust port width is increased, everything else being equal, thereby giving a better blowdown before the inlet ports are uncovered by the piston.

The use, operation and function of the invention are as follows:

This is an improved scavenging system for a two stroke cycle internal combustion engine. The particular type of engine is not important except that it must be a two cycle engine, and the scavenging system shown may be used with a dual fuel engine, a spark-fired engine or otherwise.

In any scavenging system it is important to provide sufficient port area for quickly exhausting or removing the spent products of combustion, during both blowdown and scavenging. For example, in a gas engine, the hot gases must be removed so that the temperature at the start of compression will be sufficiently low to remove any possibility of detonation. As the piston moves downward during the power stroke, it will first uncover the exhaust ports 28. As the exhaust gases are at a relatively high pressure, they will be discharged through the exhaust ports and into the exhaust manifold. As the piston continues downward it will uncover the scavenging air inlet ports 22 and the inlet air, which may be cooled and may be under pressure, but at a lower pressure than the original exhaust gas pressure, will enter. It is necessary that a substantial amount of the pressure formed by the exhaust gases be quickly removed through the exhaust ports so that when the scavenging air inlet ports are uncovered the exhaust gases will not flow back through the inlet ports. The exhaust pressure must be reduced so that the inlet air may clean out the cylinder. The inlet ports are so arranged and positioned relative to each other and to the exhaust ports that the incoming air will be directed upwardly and along one side of the cylinder wall. The incoming air is in effect swirled into the cylinder and up along one side, across the cylinder top adjacent the cylinder head, down the opposite side of the cylinder wall, the side of the exhaust ports, and out the exhaust ports.

Preferably, the inlet and exhaust ports are arranged such that one or more of the exhaust ports overlap a corresponding number of inlet ports. The actual number of ports is not essential and it is only necessary that the ports be arranged compactly such as shown. The height of the ports that are overlapped is decreased as is the height of the exhaust ports which overlap the inlet ports. The important thing is to provide maximum inlet port area and maximum exhaust port width while at the same time decreasing the total height of the combined ports so that the effective stroke will be lengthened.

Whereas the preferred form of the invention has been shown and described, it should be realized that there are many modifications, substitutions and alterations thereto within the scope of the following claim:

We claim:

In a two-stroke cycle internal combustion engine, a cylinder, cylinder head and piston, a scavenging system for said cylinder including a plurality of scavenging air inlet ports circumferentially arranged into two spaced groups positioned on opposite sides of said cylinder, a plurality of circumferentially arranged exhaust ports positioned closer to the cylinder head than said inlet ports and, in part, overlapping each of said spaced groups of inlet ports, those exhaust ports overlapping inlet ports and those inlet ports overlapped being reduced in size, each of said inlet ports forming an angle of less than 90 degrees with a line perpendicular to the cylinder axis, with the angle of inclination progressively increasing from substantially small angles for those inlet ports overlapped by exhaust ports to substantially larger angles for those inlet ports positioned away from the exhaust ports, the inlet ports in each group being effective to direct the incoming air across the cylinder, beneath the direction of flow of the exhaust gases, and to a point closer to the side of the cylinder opposite the exhaust ports, the incoming scavenging air rising on the side of the cylinder opposite the exhaust ports and descending on the side of the cylinder adjacent the exhaust ports.

References Cited in the file of this patent

UNITED STATES PATENTS

| | | |
|---|---|---|
| 1,919,829 | Curtis et al. | July 25, 1933 |
| 2,371,297 | Huber | Mar. 13, 1945 |
| 2,393,342 | Schneider | Jan. 22, 1946 |
| 2,477,712 | Anderson | Aug. 2, 1949 |
| 2,635,593 | Stoll | Apr. 21, 1953 |
| 2,720,872 | Yokoi | Oct. 18, 1955 |

FOREIGN PATENTS

| | | |
|---|---|---|
| 544,069 | Germany | Feb. 13, 1932 |
| 64,014 | Denmark | Sept. 24, 1945 |